(12) United States Patent
Suzuki et al.

(10) Patent No.: US 8,354,181 B2
(45) Date of Patent: Jan. 15, 2013

(54) BATTERY

(75) Inventors: Satoshi Suzuki, Toyota (JP); Tooru Nakai, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 201 days.

(21) Appl. No.: 12/739,229

(22) PCT Filed: Jul. 10, 2009

(86) PCT No.: PCT/JP2009/062571
§ 371 (c)(1),
(2), (4) Date: Apr. 22, 2010

(87) PCT Pub. No.: WO2010/021211
PCT Pub. Date: Feb. 25, 2010

(65) Prior Publication Data
US 2010/0233520 A1    Sep. 16, 2010

(30) Foreign Application Priority Data
Aug. 20, 2008   (JP) .................................. 2008-211872

(51) Int. Cl.
*H01M 2/12* (2006.01)
*H01M 2/08* (2006.01)

(52) U.S. Cl. ............. 429/56; 429/82; 429/175; 429/185

(58) Field of Classification Search .............. 429/53–56, 429/82–89, 121–347
See application file for complete search history.

(56) References Cited

FOREIGN PATENT DOCUMENTS

| | | |
|---|---|---|
| JP | 10-228891 * | 8/1998 |
| JP | 11-49217 | 2/1999 |
| JP | 11-283599 | 10/1999 |
| JP | 2003-346762 | 12/2003 |
| JP | 2005-142115 | 6/2005 |
| JP | 2005-317390 | 11/2005 |
| JP | 2007-220508 | 8/2007 |
| WO | WO 00/72388 A1 | 11/2000 |

OTHER PUBLICATIONS

Sano. JP 10-228891. Aug. 25, 1998. English machine translation by JPO.*

Tasai et al. JP 2003-346762 A. Dec. 5, 2003. English machine translation by JPO.*

* cited by examiner

*Primary Examiner* — Basia Ridley
*Assistant Examiner* — James Lee
(74) *Attorney, Agent, or Firm* — Finnegan, Henderson, Farabow, Garrett & Dunner, LLP

(57) ABSTRACT

Provided is a battery capable of providing both fixing durability of a protective film during normal use and peeling easiness of the protective film during operation of a safety valve. A lithium ion secondary battery (100) includes a protective film (140) fixed to a battery case (110) while covering a safety valve part (125) including a breakable portion (126). This protective film (140) has a first fixed portion (145) located around a valve-corresponding unfixed portion (144) and fixed to the battery case (110) and a second fixed portion (147) located more outside than the first fixed portion and fixed to the battery case (110) through an intermediate unfixed portion (146). They are configured such that the first fixed portion (145) first peels off when the safety valve part (125) operates, prompting peeling of the second fixed portion (147), thus releasing gas to the outside.

10 Claims, 12 Drawing Sheets

BATTERY

CROSS-REFERENCE TO RELATED APPLICATIONS

This application is a national phase application of International Application No. PCT/JP2009/062571, filed Jul. 10, 2009, and claims the priority of Japanese Application No. 2008-211872, filed Aug. 20, 2008, the contents of both of which are incorporated herein by reference.

TECHNICAL FIELD

The present invention relates to a battery provided with a battery case having a non-restoring type safety valve part including a breakable portion and a protective film fixed to the battery case while covering the safety valve part to seal the safety valve part.

BACKGROUND ART

Heretofore, there has been known a battery provided with a battery case having a safety valve (an explosion-proof valve) of a non-restoring type and a protective film fixed to the battery case while externally covering the safety valve to seal the safety valve. This protective film is used to prevent foreign matters and liquid droplets such as water and oil from sticking to the safety valve, especially its breakable portion having a thinner wall, thereby avoiding corrosion of the safety valve. For example, Patent Literatures 1 to 3 disclose a battery having such protective film.

CITATION LIST

Patent Literature

Patent Literature 1: JP 2003-346762 A
Patent Literature 2: WO 00/72388 A1
Patent Literature 3: JP 2005-142115 A

SUMMARY OF INVENTION

Technical Problem

However, in the conventional battery, the protective film is fixed in annular and solid manner to the battery case around the safety valve without contacting a portion of the battery case facing the safety valve. Accordingly, if the surface area of the solidly fixed portion of the protective film is large, fixing strength between the protective film and the battery case becomes too strong. Even when the safety valve operates, that is, even when the safety valve is opened by increase in internal pressure, allowing gas to spout or blow out, the protective film is hard to separate or peel off from the battery case and hence the gas is not allowed to be released to the outside of the protective film.

On the other hand, if the surface area of the solidly fixed portion of the protective film is small, the protective film is easy to reliably peel off from the battery case when the safety valve operates, thereby surely enabling release of gas to the outside of the protective film. However, such protective film is also apt to peel off from the battery case during normal use, causing a problem with fixing durability of the protective film.

In the conventional battery in which the protective film is fixed to the battery case in solid manner (i.e., fixed around the safety valve without facing the safety valve), it is difficult to provide both the fixing durability of the protective film during normal use and the easiness of peeling of the protective film during operation of the safety valve.

The present invention has been made in view of the circumstances to solve the above problems and has a purpose to provide a battery capable of providing both the fixing durability of a protective film during normal use and the peeling easiness of the protective film during operation of the safety valve.

Solution to Problem

To achieve the above object, one aspect of the invention provides a battery comprising: a battery case provided with a non-restoring safety valve part that includes a breakable portion and will be opened when the breakable portion is broken; and a protective film fixed to the battery case while covering the safety valve part from outside to seal the safety valve part, wherein the protective film includes at least: a valve-corresponding unfixed portion located facing the breakable portion of the safety valve part and unfixed to the battery case; a first fixed portion located outside the valve-corresponding unfixed portion and fixed to the battery case; and a second fixed portion located outside the first fixed portion through an intermediate unfixed portion unfixed to the battery case, the second fixed portion being annular and fixed to the battery case.

In this battery, the protective film is fixed to the battery case through at least the first and second fixed portions and hence can have a large surface area of the entire fixed portions. Accordingly, the protective film is hard to separate or peel off from the battery case for long periods and fixing durability can be improved.

In this battery, on the other hand, when the safety valve part is opened by increase of internal pressure, allowing gas to spout or blow out, and the gas exerts pressure on the valve-corresponding unfixed portion (during operation of the safety valve), at least a part of the first fixed portion peels off from the battery case earlier than the second fixed portion. Then, the pressure receiving area of the protective film which receives gas pressure additionally includes a peeled part of the first fixed portion. The pressure receiving area is therefore increased and large force acts on the second fixed portion, making the second fixed portion easy to peel off from the battery case. Peeling of the second fixed portion is thus prompted. Then, the inside and the outside of the second fixed portion are communicated with each other, releasing the gas to the outside. In this way, the peeling easiness of the protective film during operation of the safety valve can be improved.

Consequently, the present battery can provide both the fixing durability of the protective film during normal use and the peeling easiness of the protective film during operation of the safety valve.

As examples of the configuration of the "safety valve part", there are a configuration integrally formed with the battery case, a configuration made in a separate component from the battery case and then bonded to the battery case, and so on.

The shape of the "battery case" may be for example cylindrical, rectangular parallelepiped, etc.

The shape of the "protective film" (in plan view) may be for example rectangular, circular, oblong, elliptic, polygonal, etc.

As examples of the configuration of the "first fixed portion", there are an annular form surrounding the valve-corresponding unfixed portion or an intermittent form intermittently located around the valve-corresponding unfixed portion. The "first fixed portion" and the "second fixed portion" may be configured to be completely separated by the intermediate unfixed portion or be partially continuous.

The fixing configuration of the "first fixed portion" and the "battery case" may be achieved by for example fixing by adhesion, fixing by solder, fixing by welding, or the like. The same applies to the fixing configuration of the "second fixed portion" and the "battery case". Furthermore, the fixing configuration of the "first fixed portion" and the "battery case" and that of the "second fixed portion" and the "battery case" may be similarly made by adhesion or achieved by different ways; one by adhesion and the other by solder.

Furthermore, in the above battery, preferably, the first and second fixed portions are configured such that, when the safety valve part is opened by increase in internal pressure, allowing gas to spout out, and gas pressure of the gas acts on the valve-corresponding unfixed portion, at least a part of the first fixed portion peels off from the battery case earlier than the second fixed portion, a pressure receiving area of the protective film which receives the gas pressure is increased, prompting the second fixed portion to peel off, and at least a part of the second fixed portion peels off from the battery case to release the gas to outside.

Accordingly, both the fixing durability of the protective film during normal use and the peeling easiness of the protective film during operation of the safety valve can be achieved.

Furthermore, in the above battery, preferably, the first fixed portion has an annular shape surrounding the valve-corresponding unfixed portion.

In this battery, the first fixed portion is annular to surround the valve-corresponding unfixed portion. During normal use, therefore, the safety valve part is shielded from the case outside by not only the second fixed portion but also first fixed portion. This makes it possible to prevent foreign matters and liquid droplets such as water and oil from sticking to the safety valve part, especially its breakable portion. Accordingly, the effect of preventing corrosion of the safety valve part can be improved more effectively.

Since the first fixed portion is annular as above, the gas spouting from the safety valve during operation of the safety valve first presses only the valve-corresponding portion (not presses the intermediate fixed portion), thereby prompting the first fixed portion to peel off. When at least a part of the first fixed portion peels off, providing communication between the inside and the outside of the first fixed portion, the gas also reaches the intermediate unfixed portion located outside the first fixed portion. Accordingly, the pressure receiving area of the protective film which receives gas pressure additionally includes a peeled part of the first fixed portion and also the intermediate unfixed portion, so that the pressure receiving area is increased at once. Large force then acts on the second fixed portion, making it easy to peel off from the battery case. Peeling of the second portion is thus prompted. The inside and the outside of the second fixed portion are then communicated with each other, releasing gas to the outside. Consequently, the peeling easiness of the protective film during operation of the safety valve can be improved.

Moreover, in one of the above batteries, preferably, the first and second fixed portions are separated by the intermediate unfixed portion.

In this battery, the first and second fixed portions are separated by the intermediate unfixed portion. Accordingly, stepwise peeling can be reliably caused during the operation of the safety valve. Especially in the case where the first fixed portion has an annular shape surrounding the valve-corresponding unfixed portion, when at least a part of the first fixed portion peels off during operation of the safety valve, providing communication between the inside and the outside of the first fixed portion, gas reaches the entire intermediate unfixed portion located outside the first fixed portion. The pressure receiving area of the protective film which receives gas pressure is particularly increased. This reliably induces the second fixed portion to peel off. Consequently, the peeling easiness of the protective film during operation of the safety valve can be improved especially.

In one of the above batteries, further preferably, the battery case includes: a protrusion being located around the breakable portion and configured to protrude outside and have a top surface; and a low-lying portion being located around the protrusion and having a low-lying surface located lower than the top surface, the first fixed portion is fixed to the top surface of the protrusion, and the second fixed portion is fixed to the low-lying surface of the low-lying portion.

In this battery, the protrusion is provided in the battery case and the first fixed portion is fixed to the top surface of this protrusion, and the low-lying portion is provided in the battery case and the second fixed portion is fixed to the low-lying surface of the low-lying portion. Accordingly, the intermediate unfixed portion located between the first and second fixed portions can be made slant. An actual area of the intermediate unfixed portion can be made larger than the area of the intermediate unfixed portion when the protective film fixed to the battery case is viewed in plan view. Specifically, the actual area of the intermediate unfixed portion can be increased without the need of increasing the outer dimension of the protective film fixed to the battery case. Accordingly, the pressure receiving area of the protective film during operation of the safety valve can be increased by just that much, so that the second fixed portion reliably peels off from the battery case. Consequently, the peeling easiness of the protective film during operation of the safety valve can be improved.

In one of the above batteries, further preferably, the first and second fixed portions are respectively fixed to the battery case by adhesion.

Since the first and second fixed portions are fixed to the battery case by adhesion, the protective film can be easily and reliably fixed to the battery case. Accordingly, the battery can be provided at low cost and the fixing durability of the protective film can be sufficiently ensured.

Concrete adhering configuration includes for example a configuration that an adhesive layer is provided on the protective film and this protective film is bonded to the battery case, a configuration that an adhesive layer is provided on the battery case and the protective film is bonded to the battery case, and others.

In the above battery, preferably, the protective film includes a main body and an adhesive layer formed on an entire surface of the main body on a side to be fixed to the battery case.

In the case where the protective film is fixed to the battery case by adhesion, only a fixing portion between the protective film and the battery case, that is, the first and second fixed portions and others have only to be adhered. However, it costs to partially form an adhesive layer on the protective film main body and position and bond it to the battery case. It is therefore difficult to provide the battery at low cost. In the present battery, on the other hand, the adhesive layer is formed on the entire area of the protective film main body (the entire surface of the side to be fixed to the battery case), so that the protective film can be provided at low cost, resulting in an inexpensive battery. Moreover, it is easy to position the protective film with respect to the battery case in bonding operation.

Moreover, in one of the above batteries, preferably, the protective film is made of resin.

Since the protective film is made of resin, the protective film can be provided at lower cost than in the case where the protective film is made of metal foil or the like. This battery can also be provided at low cost. The protective film made of resin can easily have flexibility. Accordingly, even when the battery case has protrusions and recesses, the protective film can be easily and reliably fixed to the battery case and hence the fixing durability of the protective film can be sufficiently ensured. Particularly, the protective film may be transparent to allow easy observation of a state of the safety valve (the breakable portion).

DESCRIPTION OF EMBODIMENTS

First Embodiment

Figure 1:
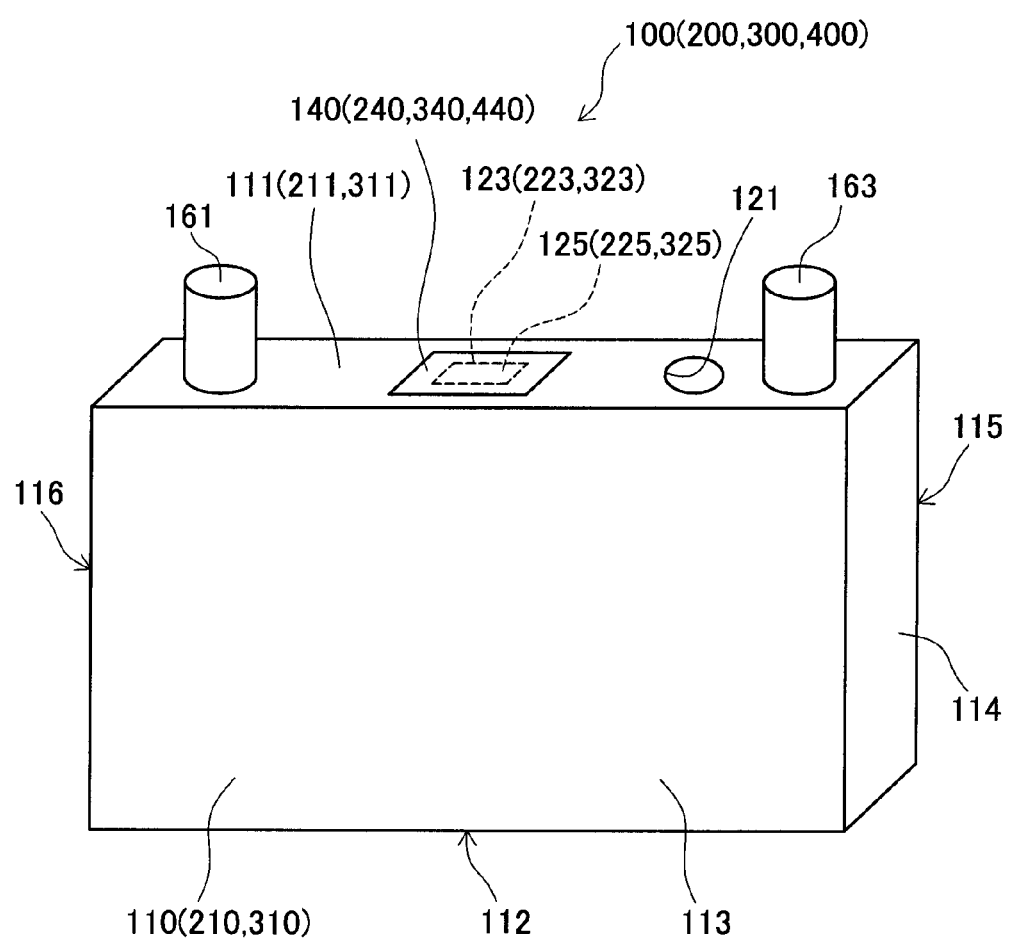
FIG. 1 is a perspective view schematically showing a lithium ion secondary battery in a first embodiment.
Figure 2:
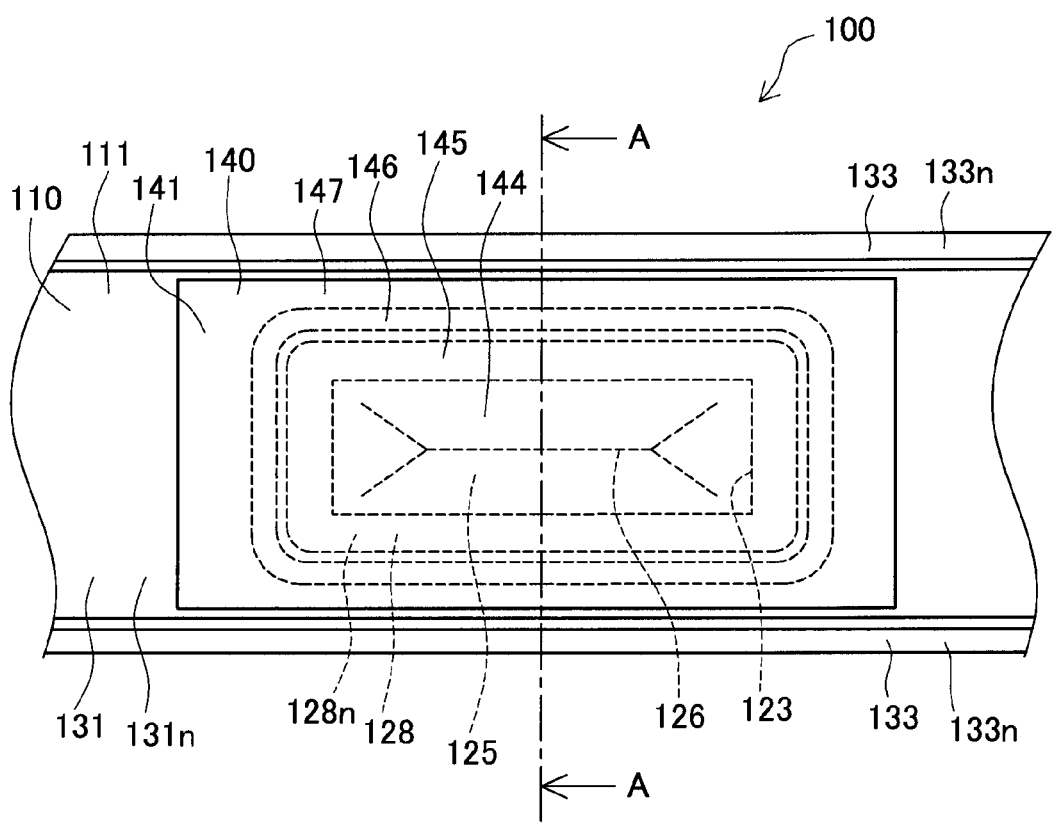
FIG. 2 is a partial plan view showing a safety valve part and its surrounding in the lithium ion secondary battery in the first embodiment.
Figure 3:
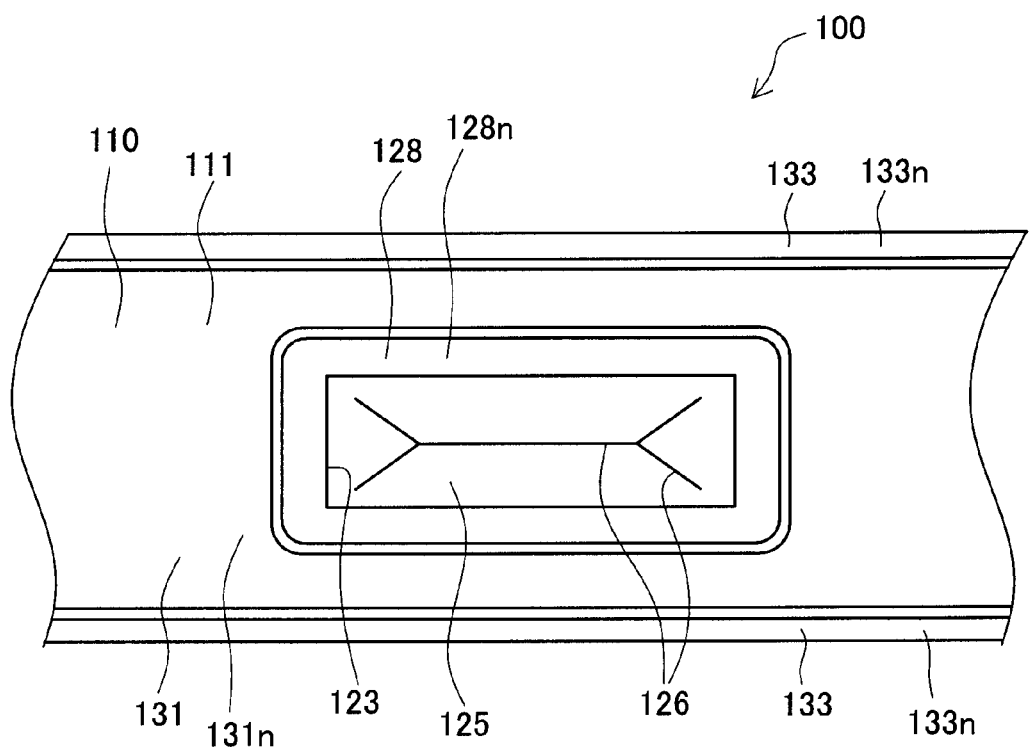
FIG. 3 is a partial plan view showing the safety valve part and its surrounding in the lithium ion secondary battery in which no protective film is provided in the first embodiment.
Figure 4:
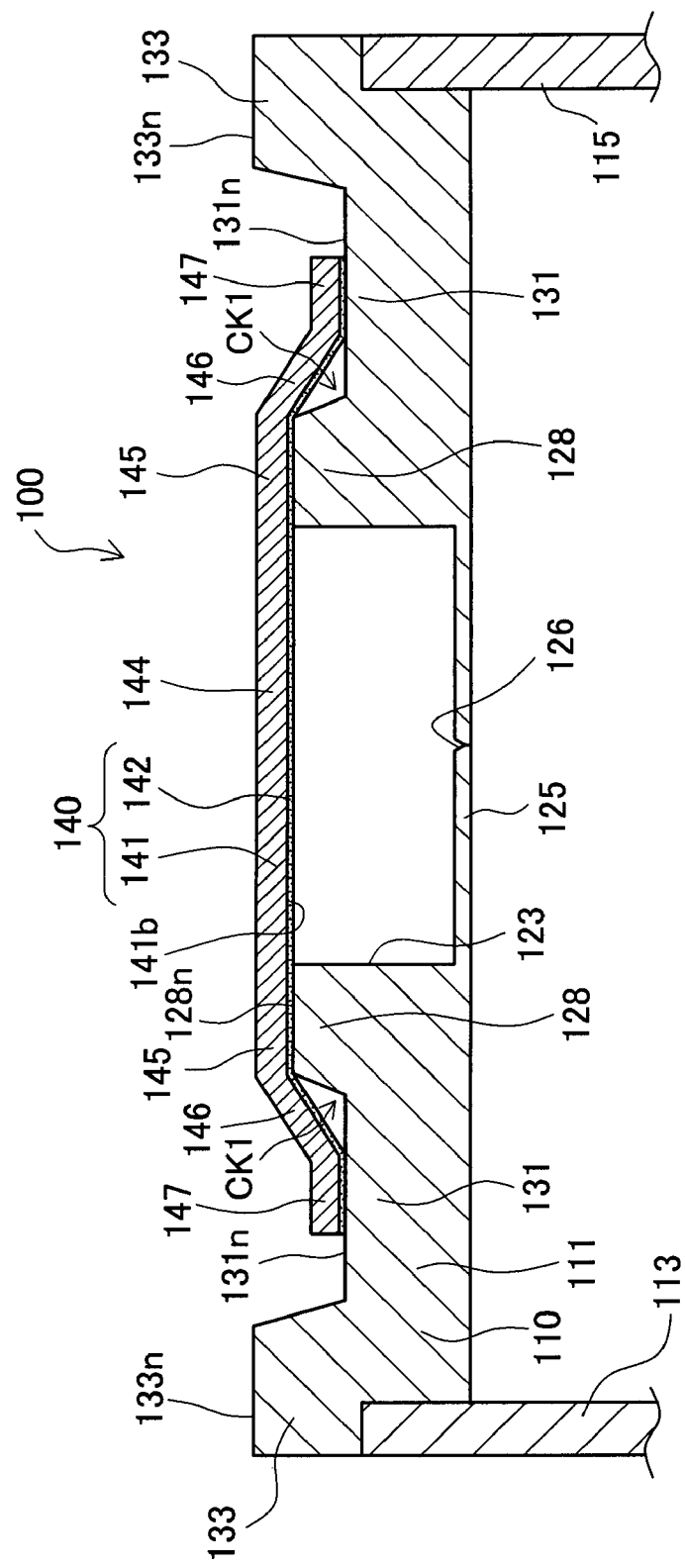
FIG. 4 is a sectional view of the safety valve part and its surrounding in the lithium ion secondary battery in the first embodiment, taken along a line A-A in FIG. 2.

A detailed description of a preferred first embodiment of the present invention will now be given referring to the accompanying drawings. FIG. 1 schematically shows a lithium ion secondary battery (a sealed battery) 100 in the first embodiment. FIGS. 2 to 4 show a safety valve part 125 and its surrounding in the lithium ion secondary battery 100. FIG. 2 shows a state including a protective film 140 and FIG. 3 shows a state including no protective film 140. FIG. 4 is a sectional view taken along a line A-A in FIG. 2. This lithium ion secondary battery 100 is a rectangular battery to be mounted in a hybrid electric car or an electric car and used for a driving source.

This lithium ion secondary battery 100 includes a battery case 110, an electrode body not shown and housed in the battery case 110, a positive terminal 161 and a negative terminal 163 fixedly provided on the battery case 110, and others (see FIG. 1). The lithium ion secondary battery 100 further includes the protective film 140 fixed or stuck to the battery case 110 while covering the safety valve part 125 provided in the battery case 110 to protect the safety valve part 125 from outside.

The battery case 110 is made of metal in a rectangular parallelepiped shape. The battery case 110 includes a case upper wall 111, a case lower wall 112 facing the upper wall 111, and four case side walls 113, 114, 115, and 116 each joining the upper and lower walls 111 and 112. Each of the upper wall 111, the lower wall 112, the side walls 113, 114, 115, and 116 has an almost flat plate shape.

Of them, the case upper wall 111 will be described in detail below. The case upper wall 111 has a narrow rectangular shape in plan view and is welded, at its peripheral edge portion, to the case side walls 113, 114, 115, and 116 respectively. At predetermined locations near both ends of the case upper wall 111 in a longitudinal direction, the positive terminal 161 and the negative terminal 163 are fixedly provided (see FIG. 1). The positive terminal 161 is electrically connected to a positive current collector of the electrode body not shown inside the battery while protruding upward from the case upper wall 111 for the use of electric connection to the outside. The negative terminal 163 is electrically connected to a negative current collector of the electrode body not shown inside the battery while protruding upward from the case upper wall 111 for the use of electric connection to the outside.

At a predetermined location nearer to the negative terminal 163 than the center of the case upper wall 111, a liquid inlet 121 is formed for pouring of electrolyte into the battery case 110.

Furthermore, in the center of the case upper wall 111, a case opening 123 having a rectangular shape in plan view is provided. Under this case opening 123 (inside the battery), the safety valve part 125 having a rectangular shape in plan view is provided so as to close the case opening 123 (see FIG. 4). This safety valve part 125 is integrally formed with the case upper wall 111 to constitute a part of the case upper wall 111. The safety valve part 125 is formed as a thin film thinner than the case upper wall 111 and includes on the upper side with a breakable portion 126 formed as a V-shaped groove. Accordingly, the safety valve part 125 is caused to operate when the internal pressure of the battery reaches a predetermined pressure. In other words, the breakable portion 126 is broken or cleaved when the internal pressure reaches the predetermined pressure, thus releasing internal gas to the outside (see FIGS. 6 and 7).

Around the breakable portion 126 and further around the case opening 123 of the case upper wall 111, an inside annular protrusion (protrusion) 128 is formed integral with the case upper wall 111 to have a rectangular annular shape surrounding the breakable portion 126 and the case opening 123 and protruding upward (see FIGS. 2 to 4). This inside annular protrusion 128 includes a flat top surface 128n in a rectangular shape in plan view.

Around the inside annular protrusion 128 of the case upper wall 111, an annular low-lying portion (a low-lying portion) 131 is formed to have a rectangular annular shape surrounding the inside annular protrusion 128 and be placed lower than the inside annular protrusion 128. An upper surface of this annular low-lying portion 131 is a flat low-lying surface 131n having a rectangular shape in plan view and located in a lower place than a top surface 128n of the inside annular protrusion 128.

Around the annular low-lying portion 131 of the case upper wall 111, a circumferential annular protrusion 133 is integrally formed with the case upper wall 111 to have a rectangular annular shape surrounding the annular low-lying portion 131 and protruding upward. This protrusion 133 constitutes a peripheral edge portion of the case upper wall 111. This protrusion 133 has a top surface 133n located higher (above) the low-lying surface 131n of the annular low-lying portion 131 and higher (above) the top surface 128n of the inside annular protrusion 128. This top surface 133n is a flat surface rectangular in plan view.

On the case upper wall 111, a protective film 140 is peelably fixed while covering the case opening 123 (the safety valve part 125) from outside of the case (from above). Specifically, the protective film 140 is stuck to the case upper wall 111 by adhesion.

This protective film 140 includes a main body 141 as a base material, and an adhesive layer 142 formed over a lower surface 141b of the protective film 141 on the side to be fixed to the case upper wall 111. This protective film 140 is made of resin. To be concrete, the main body 141 is made of synthetic resin (PPS in this embodiment) and the adhesive layer 142 is made of acrylic adhesive.

This protective film 140 includes a valve-corresponding unfixed portion 144, a first fixed portion 145, an intermediate unfixed portion 146, and a second fixed portion 147.

The valve-corresponding unfixed portion 144 is a rectangular portion in plan view placed over the case opening 123 to face the breakable portion 126 and hence the safety valve part 125. The unfixed portion 144 is unfixed to the case upper wall 111.

The first fixed portion 145 is located outside the valve-corresponding unfixed portion 144 (on the peripheral edge side than the valve-corresponding unfixed portion 144) and stuck to the case upper wall 111 around the case opening 123. Specifically, the first fixed portion 145 is a rectangular annular shape surrounding the case opening 123 and stuck to the top surface 128n of the inside annular protrusion 128 of the case upper wall 111 by the adhesive layer 142.

The second fixed portion 147 is located outside the first fixed portion 145 via the intermediate unfixed portion 146 mentioned below and stuck to the case upper wall 111. To be more specific, the second fixed portion 147 has a rectangular annular shape surrounding the first fixed portion 145 through the intermediate unfixed portion 146 and stuck to the low-lying surface 131n of the annular low-lying portion 131 of the case upper wall 111 by the adhesive layer 142.

The intermediate unfixed portion 146 is located between the first fixed portion 145 and the second fixed portion 147 and unfixed to the case upper wall 111. This intermediate unfixed portion 146 is rectangular annular to surround the first fixed portion 145 to completely separate the first fixed portion 145 and the second fixed portion 147. As described above, the first fixed portion 145 is stuck to the top surface 128n of the inside annular protrusion 128 and the second fixed portion 147 is stuck to the low-lying surface 131n of the annular low-lying portion 131. Accordingly, the intermediate unfixed portion 146 is made slant with respect to the top surface 128n and the low-lying surface 131n. A clearance (space) CK1 is formed between the intermediate unfixed portion 146 and the case upper wall 111.

In this lithium ion secondary battery 100, the protective film 140 is fixed to the battery case 110 (in particular, the case upper wall 111) through two fixed portions, i.e., the first fixed portion 145 and the second fixed portion 147 and hence can have a large surface area of the entire fixed portions. The protective film 140 is therefore hard to peel off from the battery case 110 for long periods and can have improved fixing durability.

Figure 5:
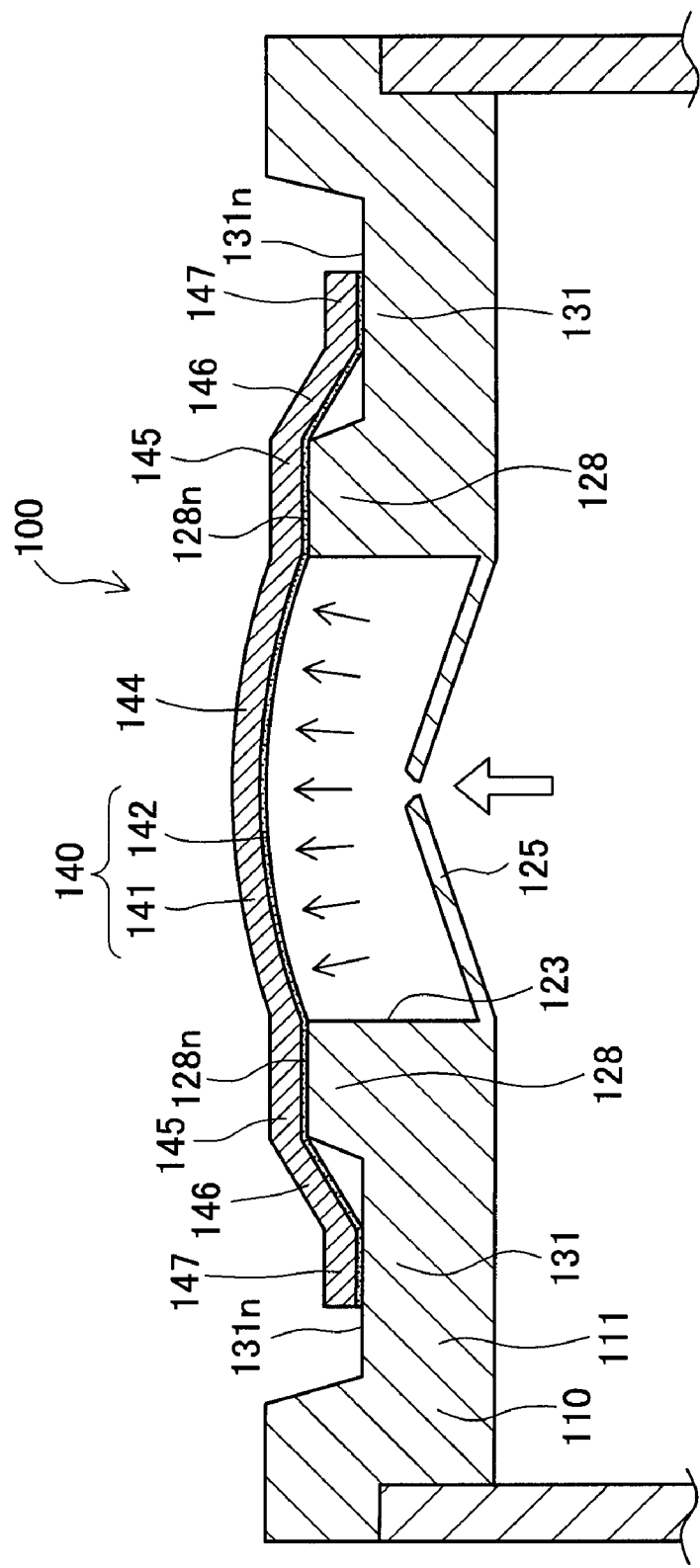
FIG. 5 is an explanatory view showing the lithium ion secondary battery in which the safety valve operates and gas pressure acts on a valve-corresponding unfixed portion of the protective film in the first embodiment.

In this lithium ion secondary battery 100, on the other hand, the safety valve part 125 operates when the internal pressure of the battery reaches the predetermined pressure (see FIG. 5). That is, the breakable portion 126 of the safety valve part 125 is broken or cleaved, allowing gas to spout out through the safety valve part 125. The gas pressure of this spouting gas firstly acts on only the valve-corresponding unfixed portion 144 of the protective film 140 facing the safety valve part 125 (the breakable portion 126).

Figure 6:
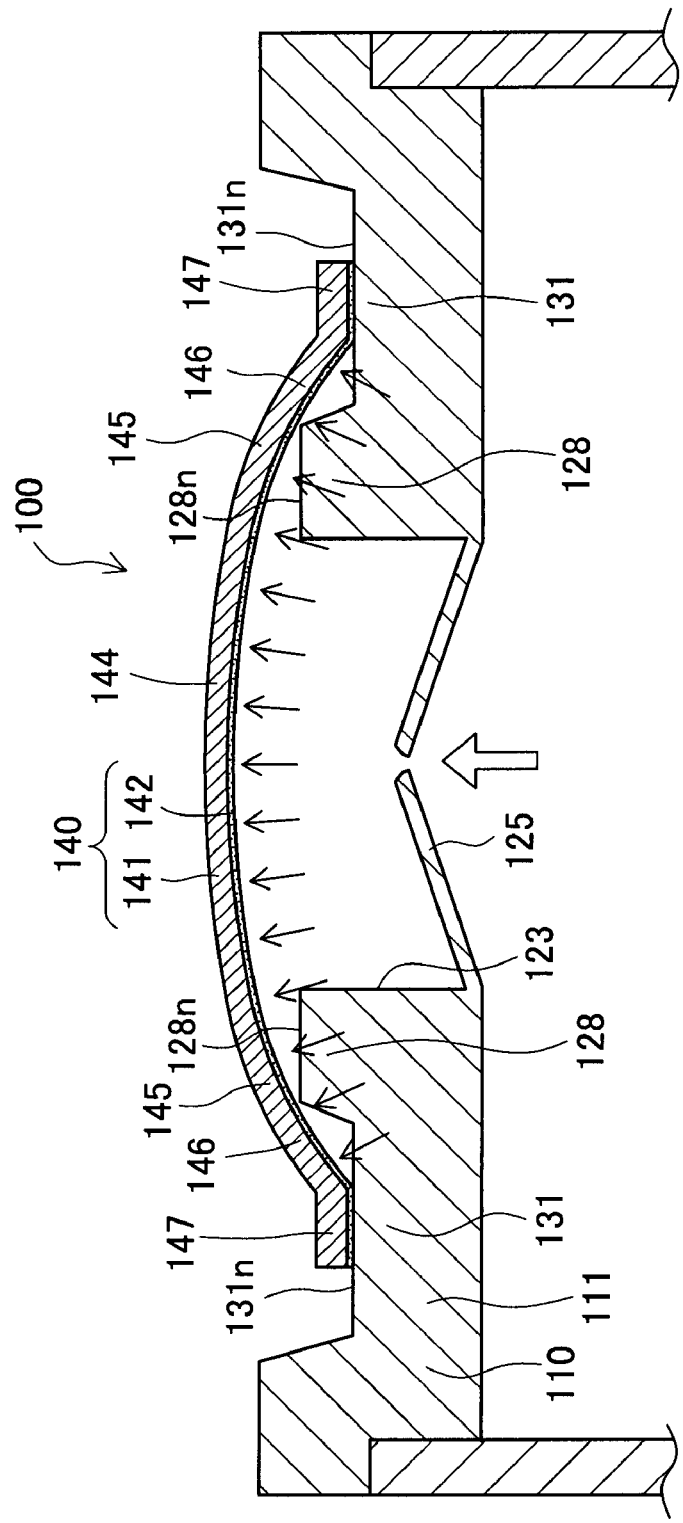
FIG. 6 is an explanatory view showing the lithium ion secondary battery in which a first fixed portion of the protective film peels off earlier from a battery case in the first embodiment.

A resultant force causes at least a part of the first fixed portion 145 of the two fixed portions (the first fixed portion 145 and the second fixed portion 147) to peel off from the battery case 110 (concretely, from the top surface 128n of the inside annular protrusion 128 of the case upper wall 111) earlier than the second fixed portion 147 (see FIG. 6).

When at least a part of the first fixed portion 145 peels off, allowing communication between the inside and the outside of the first fixed portion 145, a gas pressure-receiving area is increased at once. Specifically, the spouting gas also reaches the entire intermediate unfixed portion 146 located outside the first fixed portion 145. Thus, the pressure-receiving area of the protective film 140 which receives gas pressure additionally includes a peeled part of the first fixed portion 145 and also the entire intermediate unfixed portion 146. Consequently, the pressure-receiving area is increased at once.

Figure 7:
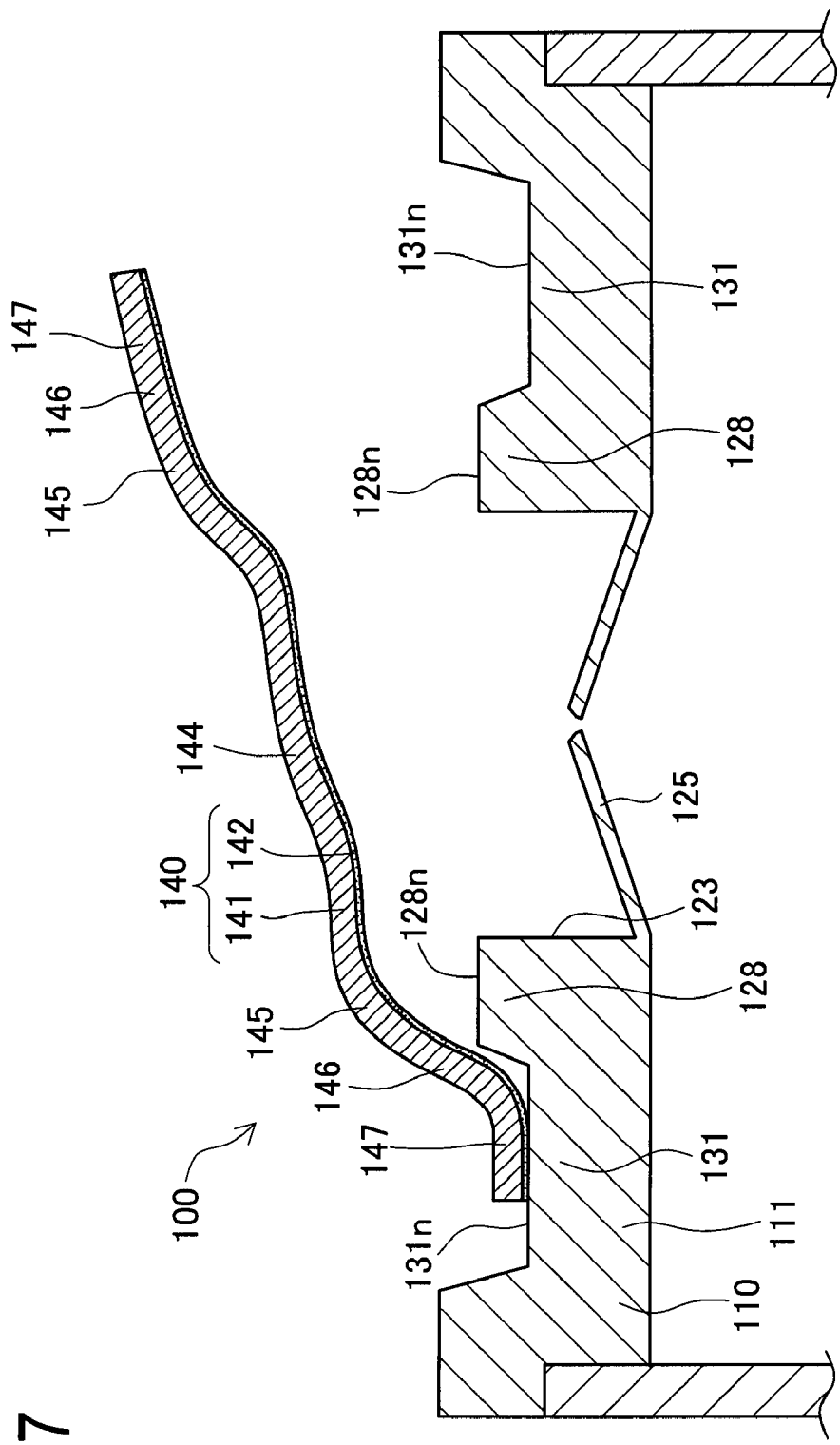
FIG. 7 is an explanatory view showing the lithium ion secondary battery in which a second fixed portion of the protective film peels off from the battery case in the first embodiment.

A resultant large force then acts on the second fixed portion 147, making it easy to peel off from the battery case 110. Peeling of the second fixed portion 147 thus advances. As shown in FIG. 7, the second fixed portion 147 is also peeled off from the battery case 110 (i.e., the low-lying surface 131n of the annular low-lying portion 131 of the case upper wall 111), thereby allowing communication between the inside and the outside of the second fixed portion 147, releasing the gas to the outside. Such stepwise peeling makes it possible to enhance the peeling easiness of the protective film 140 during operation of the safety valve part 125.

The lithium ion secondary battery 100 in the first embodiment can consequently provide both the fixing durability of the protective film 140 during normal use and the peeling easiness of the protective film 140 during operation of the safety valve.

In the lithium ion secondary battery 100, furthermore, the first fixed portion 145 and the second fixed portion 147 are formed annularly as described above. Accordingly, the safety valve part 125 during normal use is reliably shielded from the outside of the case by those fixed portions 145 and 147 (see FIG. 4). This makes it possible to prevent foreign matters and liquid droplets from sticking to the safety valve part 125, especially, the breakable portion 126 thereof, thereby further improving the effect of avoiding corrosion of the safety valve part 125.

In the lithium ion secondary battery 100, furthermore, the first fixed portion 145 and the second fixed portion 147 are separated by the intermediate unfixed portion 146, so that the aforementioned stepwise peeling can be reliably conducted during operation of the safety valve. In other words, the first fixed portion 145 is made annular as described above. When the first fixed portion 145 peels off during operation of the safety valve, thereby allowing communication between the inside and the outside of the first fixed portion 145, the gas reaches the entire intermediate unfixed portion 146 located outside the first fixed portion 145. The pressure-receiving area is remarkably increased. The second fixed portion 147 therefore reliably peels off, particularly improving the peeling easiness of the protective film 140 during operation of the safety valve.

In the lithium ion secondary battery 100, furthermore, the intermediate unfixed portion 146 located between the first and second fixed portions 145 and 147 is made slant as described above (see FIG. 4). Therefore, an actual area of the intermediate unfixed portion 146 is larger than the area of the intermediate unfixed portion 146 of the protective film 140 fixed to the battery case 110 and seen in plan view (see FIG. 2). In other words, the actual area of the intermediate unfixed portion 146 is made large without increasing the outer dimension of the protective film 140 stuck to the battery case 110. When the area of the intermediate unfixed portion 146 is large, the protective film 140 comes to have a wide pressure-receiving area by just that much after the first fixed portion 145 peels off from the battery case 110. Thus, the second fixed portion 147 can be reliably peeled off from the battery case 110. This makes it possible to further improve the peeling easiness of the protective film 140 during operation of the safety valve.

In the lithium ion secondary battery 100, furthermore, the first fixed portion 145 and the second fixed portion 147 are fixed to the battery case 110 by adhesion, so that the protective film 140 can be easily and reliably fixed to the battery case 110. Accordingly, the lithium ion secondary battery 100 can be provided at low cost and the fixing durability of the protective film 140 can be sufficiently ensured.

In the lithium ion secondary battery 100 in the first embodiment, the adhesive layer 142 is formed over the entire lower surface 141b of the main body 141. The protective film 140 can therefore be provided at lower cost as compared with an adhesive layer formed on only a part of the lower surface 141b. Consequently, the lithium ion secondary battery 100 can also be provided at low cost in this view. Furthermore, as compared with the adhesive formed on only a part of the protective film, it is easier to position the protective film 140 with respect to the battery case 110 for sticking.

In the lithium ion secondary battery 100, furthermore, the protective film 140 is made of resin, so that the protective film 140 can be provided at lower cost than in the case where the protective film 140 is made of metal foil or the like. The lithium ion secondary battery 100 can therefore be provided at lower cost. Since the protective film 140 is made of resin, the protective film 140 can easily have flexibility. Even when there are protrusions and recesses like the case upper wall 111 in the first embodiment, the protective film 140 can be easily and reliably fixed to the battery case 110. The fixing durability of the protective film 140 can thus be sufficiently ensured.

Second Embodiment

Figure 8:
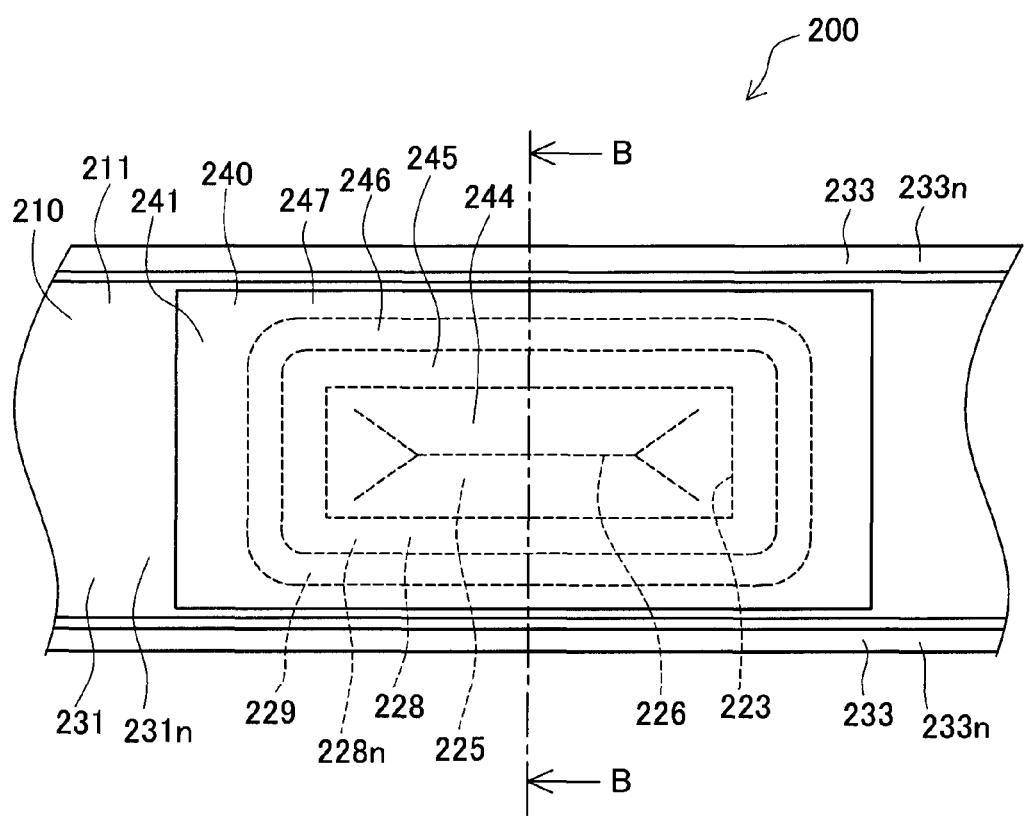
FIG. 8 is a partial plan view of a safety valve part and its surrounding in a lithium ion secondary battery in a second embodiment.
Figure 9:
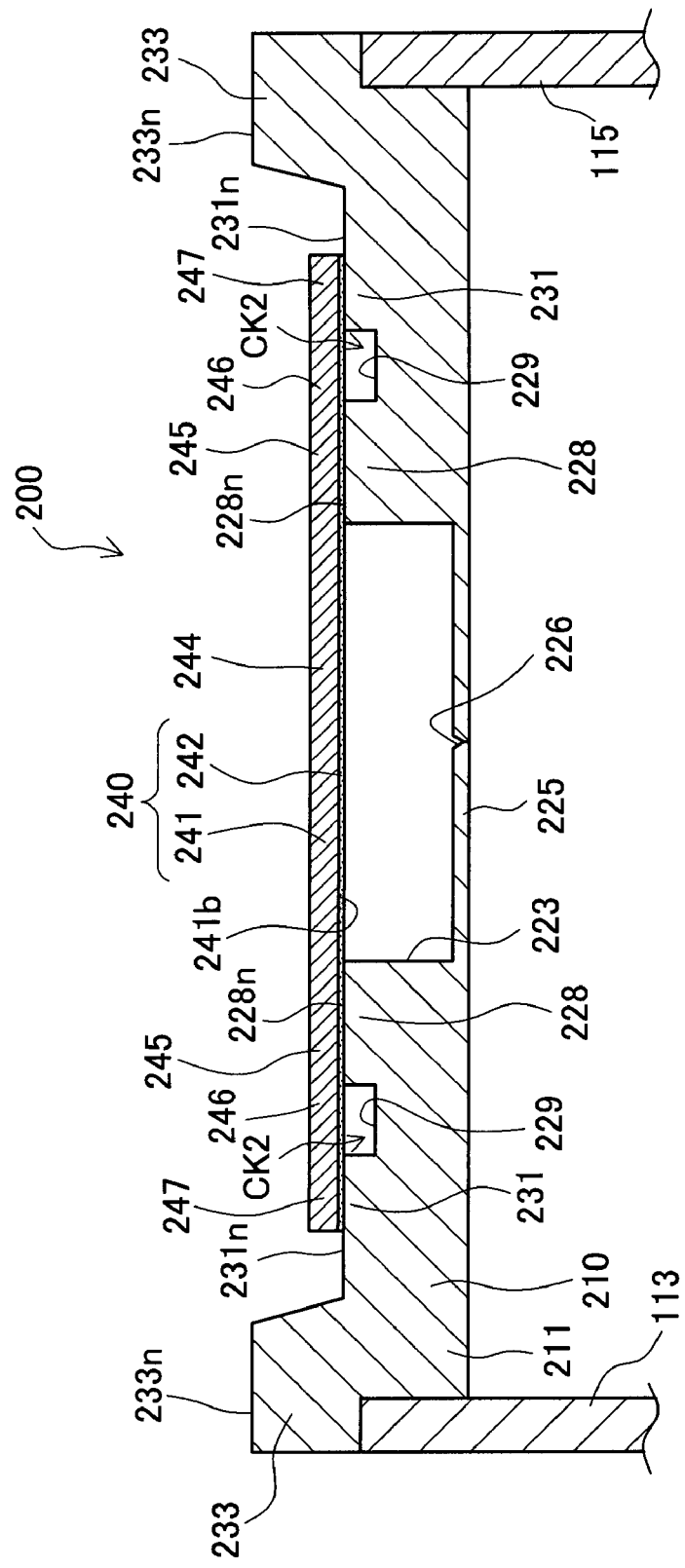
FIG. 9 is a sectional view of the safety valve part and its surrounding in the lithium ion secondary battery in the second embodiment, taken along a line B-B in FIG. 8.

A second embodiment will be described below. FIGS. 8 and 9 show a safety valve part 225 and its surrounding in a lithium ion secondary battery 200 in the second embodiment. The lithium ion secondary battery 200 in the second embodiment is substantially identical to the lithium ion secondary battery 100 in the above first embodiment excepting that a case upper wall 211 has no inside annular protrusion and the case upper wall 211 is formed with an annular groove 229. Accordingly, the explanations of the similar or identical components to those in the first embodiment are omitted or simplified.

The lithium ion secondary battery 200 in the second embodiment includes, as with the first embodiment, a battery case 210, an electrode body not shown, a positive terminal 161 and a negative terminal 163, a protective film 240, and others (see FIG. 1).

Of the battery case 210, a case lower wall 112 and case side walls 113, 114, 115, and 116 are identical to those of the battery case 110 in the first embodiment. The form of the case upper wall 211 is different from the case upper wall 111 in the first embodiment.

This case upper wall 211 is formed with a case opening 223 having a rectangular shape in plan view as with the first embodiment. However, no annular protrusion is present around the case opening 223. An inside annular portion 228 having a rectangular annular shape is formed surrounding the case opening 223. An upper surface of this inside annular portion 228 is a flat annular surface 228n having a rectangular annular shape in plan view.

Around the inside annular portion 228 of the case upper wall 211, an annular recessed groove 229 is formed having a rectangular annular shape surrounding the inside annular portion 228 and recessed downward than the annular surface 228n.

Around the annular groove 229 of the case upper wall 211, an outside annular portion 231 is provided having a rectangular annular shape surrounding the annular groove 229. An upper surface of this outside annular portion 231 is an annular surface 231n that is a flat rectangular surface in plan view and is located at the same height as the annular surface 228n of the inside annular portion 228.

Around the outside annular portion 231 of the case upper wall 211, a circumferential annular protrusion 233 is integrally formed with the case upper wall 211 to have a rectangular annular shape surrounding the outside annular portion 231 and protruding upward. This circumferential annular protrusion 233, similar to the circumferential annular protrusion 133 in the first embodiment, has a top surface 233n to constitute the peripheral edge portion of the case upper wall 211.

On the case upper wall 211, a protective film 240 is peelably fixed (concretely, is adhered) while covering the case opening 223 (the safety valve part 225) from outside of the case. This protective film 240 includes a main body 241 and an adhesive layer 242 formed entirely on a lower surface 241b of the main body 241 as with the protective film 140 in the first embodiment.

This protective film 240 includes a valve-corresponding unfixed portion 244, a first fixed portion 245, an intermediate unfixed portion 246, and a second fixed portion 247.

The valve-corresponding unfixed portion 244 is placed over the case opening 223 to face the safety valve part 225 and has a rectangular shape in plan view and is unfixed to the case upper wall 211.

The first fixed portion 245 is fixed to the case upper wall 211 around the breakable portion 226 and the case opening 223. Specifically, the first fixed portion 245 has a rectangular annular shape surrounding the case opening 223 and is stuck to the annular surface 228n of the inside annular portion 228 of the case upper wall 211 by the adhesive layer 242.

The second fixed portion 247 is located outside than the first fixed portion 245 and fixed to the case upper wall 211. Specifically, the second fixed portion 247 has a rectangular annular shape surrounding the first fixed portion 245 through the intermediate unfixed portion 246 described below and is stuck to the annular surface 231n of the outside annular portion 231 of the case upper wall 211 by the adhesive layer 242. The intermediate unfixed portion 246 is located between the first and second fixed portions 245 and 247 and over the annular groove 229. The intermediate unfixed portion 246 is not fixed to the case upper wall 211. A clearance (space) CK2 is thus formed between the intermediate unfixed portion 246 and the case upper wall 211 (the annular groove 229). This intermediate unfixed portion 246 is rectangular annular to surround the first fixed portion 245, thus completely separating the first fixed portion 245 and the second fixed portion 247.

In this lithium ion secondary battery 200, the protective film 240 is fixed to the battery case 210 (concretely, the case upper wall 211) through the two fixed portions, i.e., the first and second fixed portions 245 and 247 and hence can have a large surface area of the entire fixed portions. Thus, the protective film 240 is hard to peel off from the battery case 210 for long periods and hence can have improved fixing durability.

On the other hand, in this lithium ion secondary battery 200, the safety valve part 225 operates when the internal pressure of the battery reaches the predetermined pressure. Specifically, the safety valve part 225 is broken at the breakable portion 226, causing gas to spout out through the safety valve part 225. Gas pressure of this spouting gas first acts on only the valve-corresponding unfixed portion 244 of the protective film 240 facing the safety valve part 225 (the breakable portion 226).

This pressure causes at least a part of the first fixed portion 245 of the two fixed portions (the first and second fixed portions 245 and 247) to peel off from the battery case 210 earlier than the second fixed portion 247. When the first fixed portion 245 peels off, providing communication between the inside and the outside of the first fixed portion 245, the gas pressure receiving area is increased at once. In other words, the spouting gas also reaches the entire intermediate unfixed portion 246 located outside the first fixed portion 245. Accordingly, the pressure receiving area of the protective film 240 which receives gas pressure additionally includes a peeled part of the first fixed portion 245 and also the entire intermediate unfixed portion 246. Consequently, the pressure receiving area is increased at once.

A resultant large force then acts on the second fixed portion 247, prompting peeling of the second fixed portion 247 from the battery case 210. This second fixed portion 247 also peels off from the battery case 210, thereby allowing communication between the inside and the outside of the second fixed portion 247, releasing the gas to the outside. Such stepwise peeling makes it possible to improve the peeling easiness of the protective film 240 during operation of the safety valve part 225.

The lithium ion secondary battery 200 in the second embodiment can also provide both the fixing durability of the protective film 240 during normal use and the peeling easiness of the protective film 240 during operation of the safety valve. In addition, other parts identical to those in the first embodiment can provide the same operations and advantages as in the first embodiment.

Third Embodiment

Figure 10:
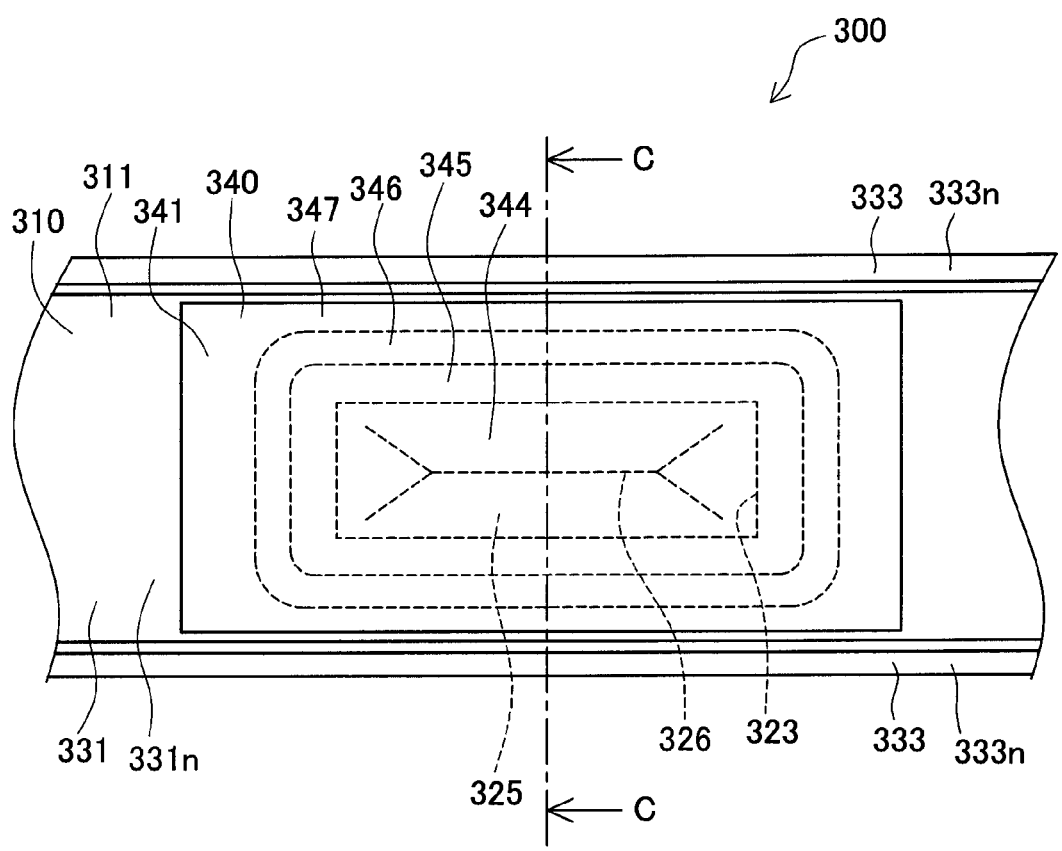
FIG. 10 is a partial plan view of a safety valve part and its surrounding in a lithium ion secondary battery in a third embodiment.
Figure 11:
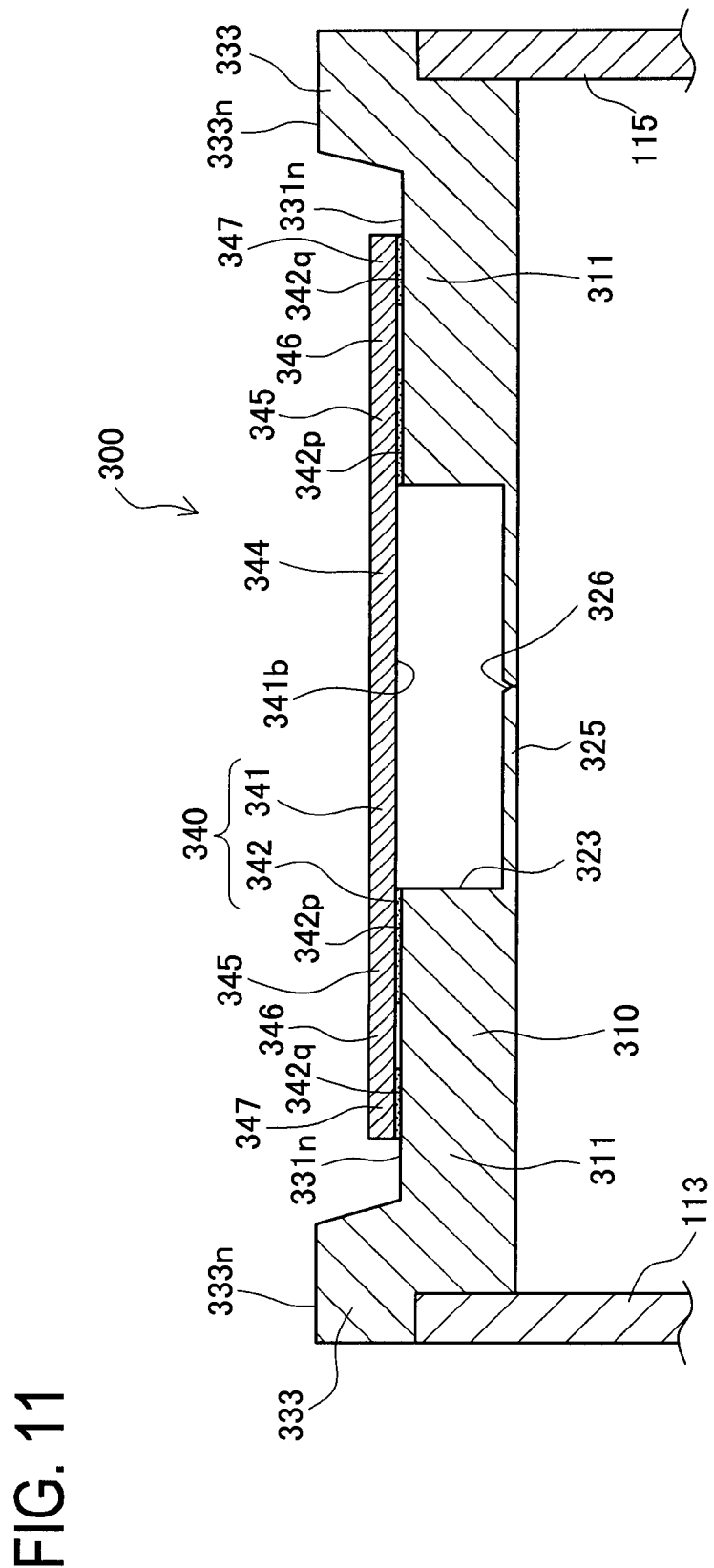
FIG. 11 is a sectional view of the safety valve part and its surrounding in the lithium ion secondary battery in the third embodiment, taken along a line C-C in FIG. 10.

A third embodiment will be described below. FIGS. 10 and 11 show a safety valve part 325 and its surrounding in a lithium ion secondary battery 300 in the third embodiment. The lithium ion secondary battery 300 in the third embodiment is different from the lithium ion secondary batteries 100 and 200 in the first and second embodiments in that a case upper wall 311 has no annular protrusion and an annular groove around a case opening 323. Furthermore, the lithium ion secondary battery 300 is different from the lithium ion secondary batteries 100 and 200 in the first and second embodiments in that an adhesive layer 342 of a protective film 340 is partially, not entirely, formed on a protective film main body 341. Others are substantially identical to those in the first or second embodiment. Identical parts to those in the first or second embodiment are explained briefly or not explained.

The lithium ion secondary battery 300 in the third embodiment, as with the first embodiment, includes a battery case 310, an electrode body not shown, a positive terminal 161 and a negative terminal 163, a protective film 340, and others (see FIG. 1).

Of the battery case 310, a case lower wall 112 and case side walls 113, 114, 115, and 116 are identical to those of the battery case 110 in the first embodiment. The form of the case upper wall 311 is different from the case upper walls 111 and 112 in the first and second embodiments.

This case upper wall 311 is formed with a case opening 323 having a rectangular shape in plan view as with the first embodiment. However, neither annular protrusion nor annular groove is present around the case opening 323. Around the case opening 323, a rectangular annular portion 331 is formed to annularly surround the case opening 323. An upper surface of this annular portion 331 is a flat annular surface 331n having a rectangular annular shape in plan view.

Around the annular portion 331 of the case upper wall 311, a circumferential annular protrusion 333 having a rectangular annular shape surrounding the annular portion 331 and protruding upward is integrally formed with the case upper wall 311. This protrusion 333, as with the circumferential annular protrusion 133 in the first embodiment, includes a top surface 333n and forms the peripheral edge portion of the case upper wall 311.

The protective film 340 is fixed (concretely, is adhered) to the case upper wall 311 while covering the case opening 323 (the safety valve part 325) from outside of the case. This protective film 340 includes a main body 341 and an adhesive layer 342 partially formed on a lower surface 341b of the main body 341 on the side to be fixed to the case upper wall 311. This adhesive layer 342 includes an inside adhesive portion 342p in a rectangular annular shape located in a predetermined inside place and an outside adhesive portion 342q in a rectangular annular shape located in a predetermined place more outside than the inside adhesive portion 342p.

In the protective film 340, a portion with the inside adhesive portion 342p is a first fixed portion 345 and a portion with the outside adhesive portion 342q is a second fixed portion 347. A central portion located inside of the first fixed portion 345 and provided with no adhesive layer 342 is a valve-corresponding unfixed portion 344. A portion located between the first and second fixed portions 345 and 347 and provided with no adhesive layer 342 is an intermediate unfixed portion 346.

The valve-corresponding unfixed portion 344 is a rectangular portion in plan view facing the safety valve part 325 and located over the case opening 323 but not fixed to the case upper wall 311.

The first fixed portion 345 is fixed to the case upper wall 311 around the breakable portion 326 and the case opening 323. To be more concrete, the first fixed portion 345 has a rectangular annular shape surrounding the case opening 323 and stuck to the annular surface 331n of the annular portion 331 of the case upper wall 311 by the adhesive layer 342 (i.e., the inside adhesive portion 342p).

The second fixed portion 347 is located outside the first fixed portion 345 and fixed to the case upper wall 311. To be concrete, the second fixed portion 347 has a rectangular annular shape surrounding the first fixed portion 345 through the intermediate unfixed portion 346 and stuck to the annular surface 331n of the annular portion 331 of the case upper wall 311 by the adhesive layer 342 (i.e., the outside adhesive portion 342q).

The intermediate unfixed portion 346 is located between the first and second fixed portions 345 and 347 but not fixed to the case upper wall 311. This intermediate unfixed portion 346 has a rectangular annular shape surrounding the first fixed portion 345 to completely separate the first and second fixed portions 345 and 347 from each other.

In this lithium ion secondary battery 300, the protective film 340 is fixed to the battery case 310 (concretely, the case upper wall 311) through the two fixed portions, i.e., the first and second fixed portions 345 and 347 and hence can have a large surface area of the entire fixed portions. Accordingly, the protective film 340 is hard to peel off from the battery case 310 for long periods and can have improved fixing durability.

In this lithium ion secondary battery 300, on the other hand, the safety valve part 325 operates when the internal pressure in the battery reaches the predetermined pressure. In other words, the safety valve part 325 is broken at the breakable portion 326, allowing gas to spout out through the safety valve part 325. Gas pressure of the spouting gas first acts on only the valve-corresponding unfixed portion 344 of the protective film 340 facing the safety valve part 325 (the breakable portion 326).

This pressure causes at least a part of the first fixed portion 345 of the two fixed portions (the first and second fixed portions 345 and 347) to peel off from the battery case 310 earlier than the second fixed portion 347. When the first fixed portion 345 peels off, providing communication between the inside and the outside of the first fixed portion 345, the pressure receiving area of the gas is increased at once. In other words, the spouting gas also reaches the entire intermediate unfixed portion 346 located outside the first fixed portion 345. Accordingly, the pressure receiving area of the protective film 340 which receives gas pressure additionally includes a peeled part of the first fixed portion 345 and also the entire intermediate unfixed portion 346. The pressure receiving area is increased at once.

A resultant large force acts on the second fixed portion 347, prompting peeling of the second fixed portion 347 from the battery case 310. This second fixed portion 347 also peels off from the battery case 310 and the inside and the outside of the second fixed portion 347 are communicated with each other, releasing the gas to the outside. Such stepwise peeling makes it possible to improve the peeling easiness of the protective film 340 during operation of the safety valve part 325.

The lithium ion secondary battery 300 in the third embodiment can also provide both the fixing durability of the protective film 340 during normal use and the peeling easiness of the protective film 340 during operation of the safety valve. In addition, other parts identical to those in the first embodiment can provide the same operations and advantages as in the first embodiment.

The present invention is explained along the above embodiments but not limited to the first to third embodiments. The present invention may be embodied in other specific forms without departing from the essential characteristics thereof.

For instance, the first to third embodiments exemplify the safety valve parts 125, 225, and 325 integrally formed in the case upper walls 111, 211, and 311 respectively. Alternatively, the present invention may be applied to a configuration that the safety valve part is made as a separate component from the battery case and then is bonded to the battery case.

The first to third embodiments exemplify the safety valve parts 125, 225, and 325 provided on the lower side (inside the case) of the case openings 123, 223, and 323 respectively. Alternatively, the safety valve parts 125, 225, and 325 may be provided on the upper side (outside the case) of the case openings 123, 223, and 323 respectively.

Furthermore, the first to third embodiments exemplify the first fixed portions 145, 245, and 345 of the protective films 140, 240, and 340, formed in an annular shape surrounding the case openings 123, 223, and 323, respectively. Alternatively, the first fixed portions 145, 245, and 345 may be formed in a dotted island shape intermittently located around the case openings 123, 223, and 323 respectively.

Figure 12:
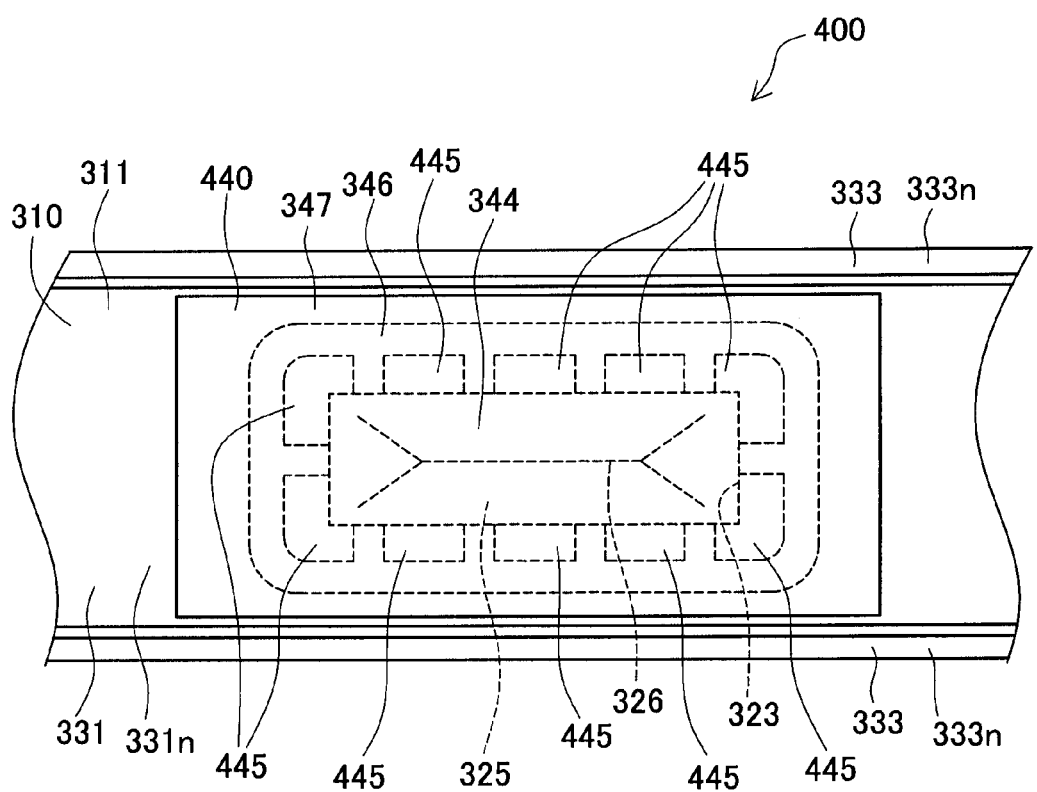
FIG. 12 is a partial plan view showing a safety valve part and its surrounding in a lithium ion secondary battery in a modified example of the third embodiment.

For instance, FIG. 12 shows a lithium ion secondary battery 400 in a modified example of the third embodiment, in which first fixed portions 445 of a protective film 440 are intermittently present like dotted islands around the breakable portion 326 and the case opening 325.

The first to third embodiments furthermore exemplify that the first fixed portion 145, 245, 345 and the second fixed portion 147, 247, 347 are completely separated by the intermediate unfixed portion 146, 246, 346. Alternatively, the first fixed portion 145, 245, 345 and the second fixed portion 147, 247, 347 may be partially continuous.

REFERENCE SIGNS LIST 100, 200, 300, 400 Lithium ion secondary battery (Sealed battery)
110, 210, 310 Battery case
111, 211, 311 Case upper wall
125, 225, 325 Safety valve part
126, 226, 326 Breakable portion
128 Inside annular protrusion (Protrusion)
128n Top surface
131 Annular low-lying portion (Low-lying portion)
131n Low-lying surface
140, 240, 340, 440 Protective film
141, 241, 341 Protective film main body
142, 242, 342 Adhesive layer
144, 244, 344 Valve-corresponding unfixed portion
145, 245, 345, 445 First fixed portion
146, 246, 346 Intermediate unfixed portion
147, 247, 347 Second fixed portion

The invention claimed is:

1. A battery comprising:
a battery case provided with a non-restoring safety valve part that includes a breakable portion and will be opened when the breakable portion is broken; and
a protective film fixed to the battery case while covering the safety valve part from outside to seal the safety valve part,
wherein the protective film includes at least:
a valve-corresponding unfixed portion located facing the breakable portion of the safety valve part and unfixed to the battery case;
a first fixed portion located outside the valve-corresponding unfixed portion and fixed to the battery case by adhesion;
a second fixed portion located outside the first fixed portion through an intermediate unfixed portion unfixed to the battery case, the second fixed portion being annular and fixed to the battery case by adhesion; and
a main body and an adhesive layer formed on an entire surface of the main body on a side to be fixed to the battery case.

2. The battery according to claim 1, wherein the first and second fixed portions are configured such that,
   when the safety valve part is opened by increase in internal pressure, allowing gas to spout out, and gas pressure of the gas acts on the valve-corresponding unfixed portion,
   at least a part of the first fixed portion peels off from the battery case earlier than the second fixed portion,
   a pressure receiving area of the protective film which receives the gas pressure is increased, prompting the second fixed portion to peel off, and
   at least a part of the second fixed portion peels off from the battery case to release the gas to outside.

3. The battery according to claim 1, wherein the first fixed portion has an annular shape surrounding the valve-corresponding unfixed portion.

4. The battery according to claim 1, wherein the first and second fixed portions are separated by the intermediate unfixed portion.

5. The battery according to claim 1, wherein
   the battery case includes:
   a protrusion being located around the breakable portion and configured to protrude outside and have a top surface; and
   a low-lying portion being located around the protrusion and having a low-lying surface located lower than the top surface,
   the first fixed portion is fixed to the top surface of the protrusion, and
   the second fixed portion is fixed to the low-lying surface of the low-lying portion.

6. The battery according to claim 1, wherein the protective film is made of resin.

7. The battery according to claim 2, wherein the first fixed portion has an annular shape surrounding the valve-corresponding unfixed portion.

8. The battery according to claim 2, wherein the first and second fixed portions are separated by the intermediate unfixed portion.

9. The battery according to claim 2, wherein
   the battery case includes:
   a protrusion being located around the breakable portion and configured to protrude outside and have a top surface; and
   a low-lying portion being located around the protrusion and having a low-lying surface located lower than the top surface,
   the first fixed portion is fixed to the top surface of the protrusion, and
   the second fixed portion is fixed to the low-lying surface of the low-lying portion.

10. The battery according to claim 2, wherein the protective film is made of resin.

* * * * *